: US008974114B2

(12) United States Patent
Derr et al.

(10) Patent No.: US 8,974,114 B2
(45) Date of Patent: Mar. 10, 2015

(54) TEMPERATURE VERIFICATION FOR ULTRASONIC FLOW METERS

(75) Inventors: Charles W. Derr, Spring, TX (US); Henry C. Straub, Jr., Sugar Land, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 392 days.

(21) Appl. No.: 13/462,613

(22) Filed: May 2, 2012

(65) Prior Publication Data
US 2013/0294475 A1 Nov. 7, 2013

(51) Int. Cl.
*G01K 15/00* (2006.01)
*G01K 19/00* (2006.01)
*G01K 13/02* (2006.01)
*G01F 1/66* (2006.01)
*G01F 1/688* (2006.01)
*G01F 1/708* (2006.01)

(52) U.S. Cl.
CPC ............... *G01K 15/00* (2013.01); *G01K 13/02* (2013.01); *G01F 1/66* (2013.01); *G01F 1/662* (2013.01); *G01F 1/668* (2013.01); *G01F 1/6882* (2013.01); *G01F 1/7082* (2013.01)
USPC ............................................................ 374/1

(58) Field of Classification Search
CPC .......... G01K 15/00; G01K 13/02; G01F 1/66; G01F 1/662; G01F 1/6882; G01F 1/668; G01F 1/7082
USPC .......... 374/1, E15.001; 73/861.18, 1.16, 1.35
See application file for complete search history.

(56) References Cited

U.S. PATENT DOCUMENTS

| 3,564,912 A | | 2/1971 | Malone et al. | |
|---|---|---|---|---|
| 3,575,050 A | * | 4/1971 | Lynnworth | ................ 73/861.27 |

(Continued)

FOREIGN PATENT DOCUMENTS

| JP | 01134213 A | * | 5/1989 | ................ G01F 1/32 |
|---|---|---|---|---|
| KR | 10-2004-0056254 A | | 6/2004 | |

OTHER PUBLICATIONS

Herrmann et al., "A New Low Pressure Calibration Facility Using 8-Path Ultrasonic Meters As Working Standards," 6th ISFFM, pp. 1-6, May 2006.

(Continued)

*Primary Examiner* — Lisa Caputo
*Assistant Examiner* — Philip Cotey
(74) *Attorney, Agent, or Firm* — Conley Rose, P.C.

(57) ABSTRACT

Apparatus and methods for verifying temperature measurements in an ultrasonic flow meter. In one embodiment, an ultrasonic flow metering system includes a passage for fluid flow, a temperature sensor, and an ultrasonic flow meter. The temperature sensor is disposed to measure temperature of fluid flowing in the passage. The ultrasonic flow meter includes a plurality of pairs of ultrasonic transducers and control electronics. Each pair of transducers is configured to form a chordal path across the passage between the transducers. The control electronics are coupled to the ultrasonic transducers. The control electronics are configured to measure speed of sound between each pair of transducers based on ultrasonic signals passing between the transducers of the pair. The control electronics are also configured to determine, based on the measured speeds of sound, whether a measured temperature value provided by the temperature sensor accurately represents temperature of the fluid flowing in the passage.

22 Claims, 8 Drawing Sheets

(56) References Cited

U.S. PATENT DOCUMENTS

| | | | |
|---|---|---|---|
| 3,940,685 A | 2/1976 | Ebata | |
| 4,646,575 A | 3/1987 | O'Hair et al. | |
| 5,856,622 A * | 1/1999 | Yamamoto et al. | 73/861.28 |
| 6,877,387 B1 * | 4/2005 | Certon et al. | 73/861.29 |
| 6,895,825 B1 * | 5/2005 | Barkhoudarian | 73/861.28 |
| 7,752,919 B2 | 7/2010 | Straub, Jr. et al. | |
| 8,155,895 B2 | 4/2012 | Derr et al. | |
| 2004/0011141 A1 | 1/2004 | Lynnworth | |
| 2009/0249769 A1 * | 10/2009 | Flanagan et al. | 60/286 |
| 2010/0010756 A1 * | 1/2010 | Derr et al. | 73/861.28 |
| 2010/0305882 A1 * | 12/2010 | Gysling | 702/47 |
| 2011/0209558 A1 * | 9/2011 | Sugiura et al. | 73/861.18 |
| 2012/0204620 A1 * | 8/2012 | Straub, Jr. | 73/861.18 |
| 2013/0081477 A1 * | 4/2013 | Gotou et al. | 73/861.02 |
| 2014/0109645 A1 * | 4/2014 | Ramsay | 73/1.34 |

OTHER PUBLICATIONS

International Patent Application No. PCT/US2013/039196, PCT International Search Report and Written Opinion dated Sep. 16, 2013 (11 pgs).

\* cited by examiner

TEMPERATURE VERIFICATION FOR ULTRASONIC FLOW METERS

BACKGROUND

Natural gas is transported from place-to-place via pipelines. It is desirable to know with accuracy the amount of gas flowing in the pipeline, and particular accuracy is demanded when the fluid is changing hands, or "custody transfer." Even where custody transfer is not taking place, however, measurement accuracy is desirable, and in these situations flow meters may be used.

Ultrasonic flow meters are one type of flow meter that may be used to measure the amount of fluid flowing in a pipeline. Ultrasonic flow meters have sufficient accuracy to be used in custody transfer. In an ultrasonic flow meter, acoustic signals are sent back and forth across the fluid stream to be measured. Based on parameters of received acoustic signals, the fluid flow velocity in the flow meter is determined. The volume of fluid flowing the meter can be determined from determined flow velocities and the known cross-sectional area of the flow meter.

The transit time of acoustic signals in an ultrasonic flow meter is a function of the speed of sound in the fluid. Temperature is one factor affecting the speed of sound in fluid. Consequently, an error in temperature measurement can result in undesirable inaccuracy in flow measurement. Therefore, techniques for identifying errors in measurement of temperature of fluid flowing through an ultrasonic flow meter are desirable.

SUMMARY

Apparatus and methods for verifying temperature measurements in an ultrasonic flow meter are disclosed herein. In one embodiment, an ultrasonic flow metering system includes a passage for fluid flow, a temperature sensor, and an ultrasonic flow meter. The temperature sensor is disposed to measure temperature of fluid flowing in the passage. The ultrasonic flow meter includes a plurality of pairs of ultrasonic transducers and control electronics. Each pair of transducers is configured to form a chordal path across the passage between the transducers. The control electronics are coupled to the ultrasonic transducers. The control electronics are configured to measure speed of sound between each pair of transducers based on ultrasonic signals passing between the transducers of the pair. The control electronics are also configured to determine, based on the measured speeds of sound, whether a measured temperature value provided by the temperature sensor accurately represents temperature of the fluid flowing in the passage.

In another embodiment, a method for verifying temperature of a fluid in a fluid stream includes measuring speed of sound for each of a plurality of chordal paths of an ultrasonic meter based on ultrasonic signals passing between a transducer pair of each chordal path. Temperature of fluid in the fluid stream is measured based on a signal provided by a temperature sensor disposed in the fluid stream. Based on the speed of sound measured for each chordal path, whether the measured temperature accurately represents the temperature of the fluid in the fluid stream is determined.

In a further embodiment, an ultrasonic flow meter includes control electronics and a plurality of pairs of ultrasonic transducers. Each pair of transducers is configured to form a chordal path across a fluid passage between the transducers. The control electronics are coupled to the ultrasonic transducers. The control electronics are configured to measure speed of sound for each chordal path based on ultrasonic signals passing between the transducers of the chordal path. The control electronics are also configured to determine temperature of fluid in a fluid stream. The determined temperature is based on a measurement by a temperature sensor disposed in the fluid stream. The control electronics are further configured to determine, based on the speed of sound measured for each chordal path, whether the determined temperature accurately represents the temperature of the fluid in the fluid stream.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
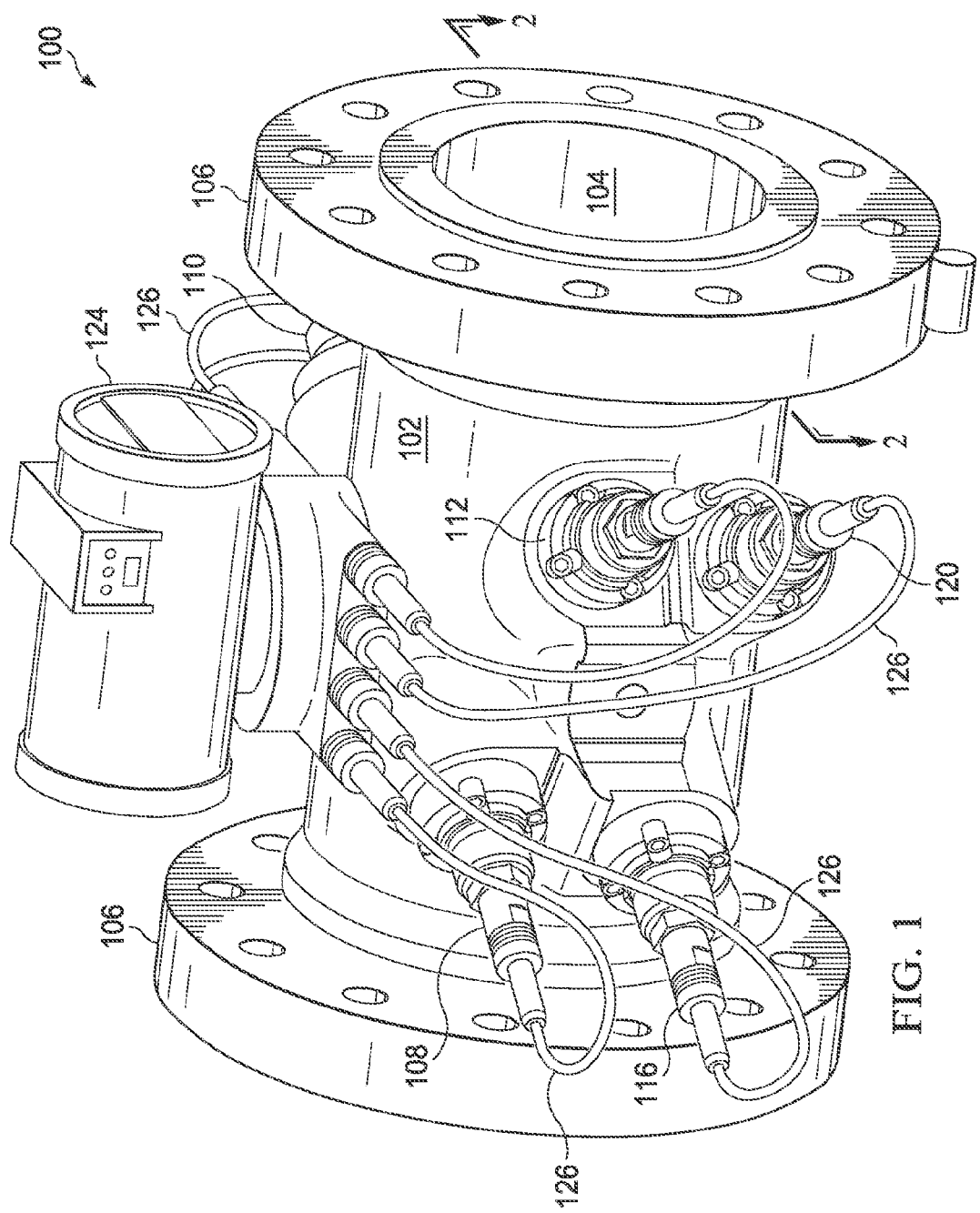
FIG. 1 shows an ultrasonic flow meter in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following description is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow.

FIG. 1 shows an ultrasonic flow meter 100 in accordance with various embodiments. The ultrasonic flow meter 100 includes a meter body or spool piece 102 that defines a central passage or bore 104. The spool piece 102 is designed and constructed to be coupled to a pipeline or other structure (not shown) carrying fluids (e.g., natural gas) such that the fluids flowing in the pipeline travel through the central bore 104. While the fluids travel through the central bore 104, the ultrasonic flow meter 100 measures the flow rate (hence, the fluid may be referred to as the measured fluid). The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flow meter 100 includes a plurality of transducer assemblies. In the view of FIG. 1 five such transducers assembles 108, 110, 112, 116 and 120 are in full or partial view. The transducer assemblies are paired (e.g., transducer assemblies 108 and 110), as will be further discussed below. Moreover, each transducer assembly electrically couples to control electronics package 124. More particular, each transducer assembly is electrically coupled to the control electronics package 124 by way of a respective cable 126 or equivalent signal conducting assembly.

Figure 2:
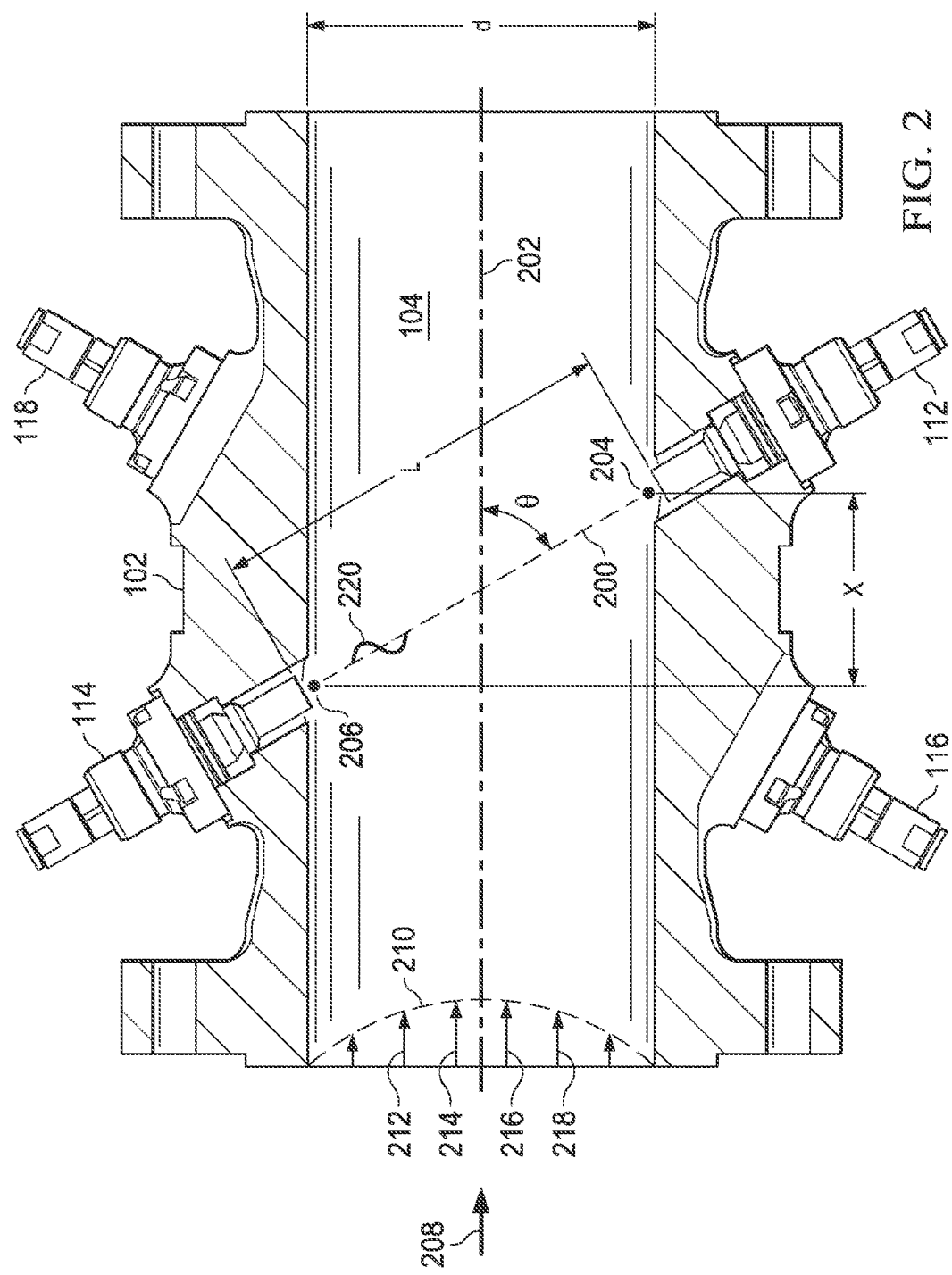
FIG. 2 shows a cross-sectional overhead view of an ultrasonic flow meter in accordance with various embodiments.

FIG. 2 shows a cross-sectional overhead view of the ultrasonic flow meter 100 taken substantially along line 2-2 of FIG. 1. Spool piece 102 has a predetermined size and defines the central bore 104 through which the measured fluid flows. An illustrative pair of transducers assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics associated with the flow meter 100 (e.g., the control electronics 124).

A path 200, also referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length d corresponding to the pipe inside diameter. In most cases distances d, X, and L are precisely determined during flow meter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Some time later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 100 carrying the fluid, the average velocity over the area of the central bore 104 may be used to find the volume of fluid flowing through the spool piece 102.

Figure 3:
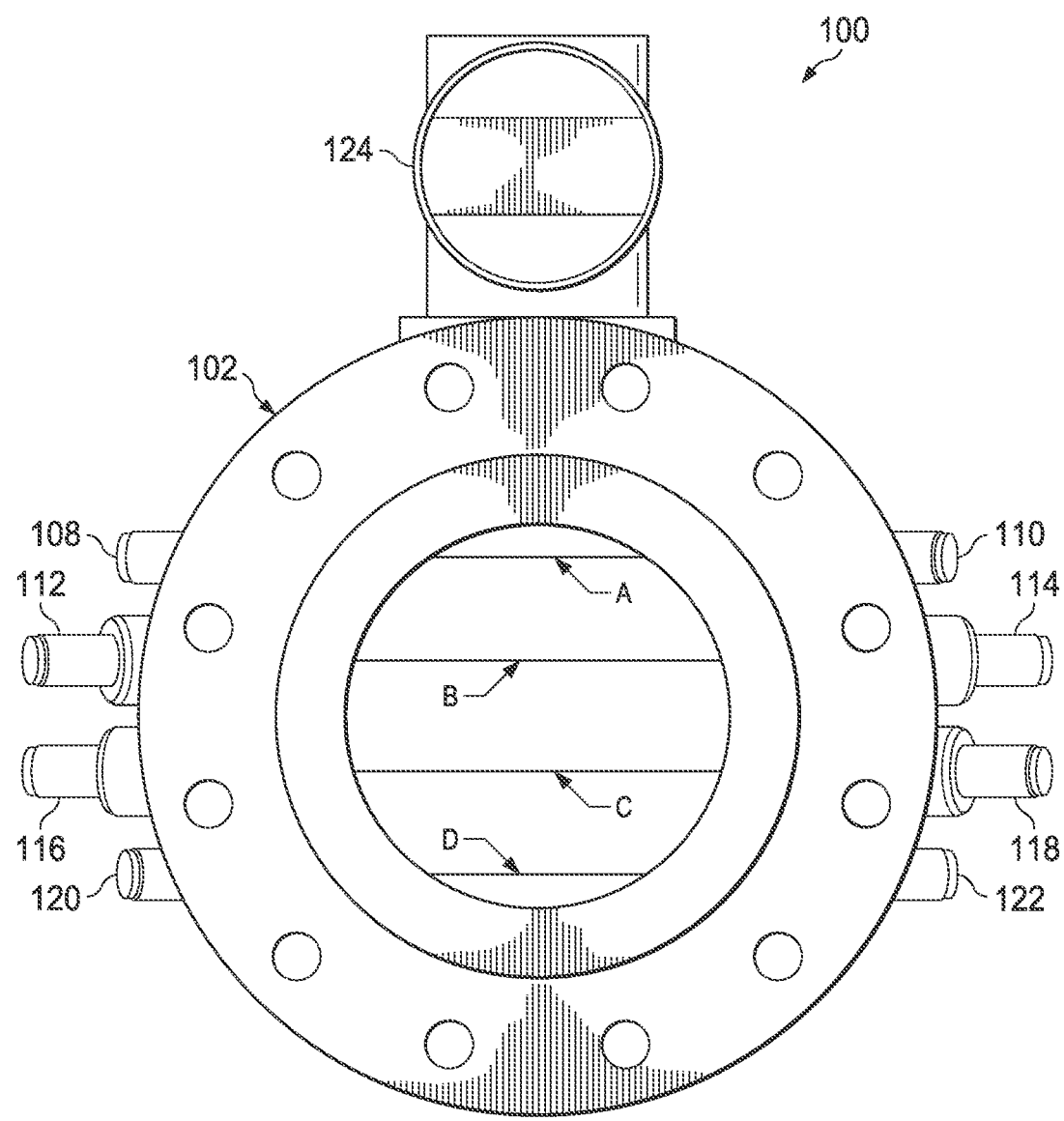
FIG. 3 shows an end elevation view of an ultrasonic flow meter in accordance with various embodiments.

Ultrasonic flow meters can have one or more chords. FIG. 3 illustrates an end elevation view of ultrasonic flow meter 100. In particular, illustrative ultrasonic flow meter 100 comprises four chordal paths A, B, C and D at varying elevations within the spool piece 102. Each chordal path A-D corresponds to a transducer pair behaving alternately as a transmitter and receiver. Transducer assemblies 108 and 110 (only partially visible) make up chordal path A. Transducer assemblies 112 and 114 (only partially visible) make up chordal path B. Transducer assemblies 116 and 118 (only partially visible) make up chordal path C. Finally, transducer assemblies 120 and 122 (only partially visible) make up chordal path D.

Figure 4:
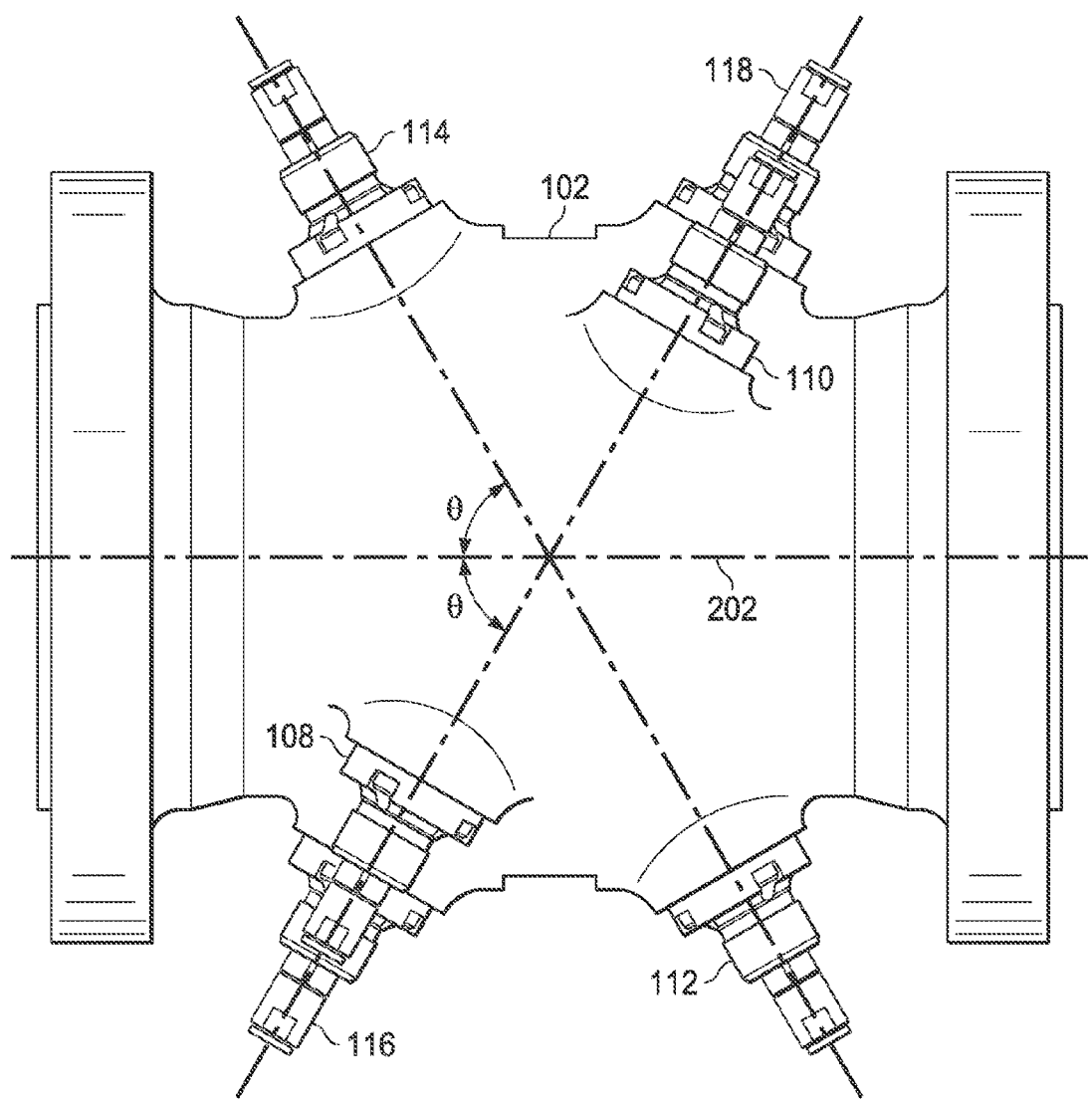
FIG. 4 shows an arrangement of transducer pairs of an ultrasonic flow meter in accordance with various embodiments

A further aspect of the arrangement of the four pairs of transducers is shown with respect to FIG. 4, which shows an overhead view. Each transducer pair corresponds to a single chordal path of FIG. 3; however, the transducer assemblies are mounted at a non-perpendicular angle to the center line 202. For example, a first pair of transducer assemblies 108 and 110 is mounted at a non-perpendicular angle θ to centerline 202 of spool piece 102. Another pair of transducer assemblies 112 and 114 is mounted so that the chordal path loosely forms the shape of an "X" with respect to the chordal path of transducer assemblies 108 and 110. Similarly, transducer assemblies 116 and 118 are placed parallel to transducer assemblies 108 and 110, but at a different "level" or elevation. Not explicitly shown in FIG. 4 is the fourth pair of transducer assemblies (i.e., transducer assemblies 120 and 122). Considering FIGS. 2, 3 and 4, the transducers pairs may be arranged such that the upper two pairs of transducers corresponding to chords A and B form an the shape of an "X", and the lower two pairs of transducers corresponding to chords C and D also form the shape of an "X". The flow velocity of the fluid may be determined at each chord A-D to obtain chordal flow velocities, and the chordal flow velocities are combined to determine an average flow velocity over the entire pipe. From the average flow velocity, the amount of fluid flowing in the spool piece, and thus the pipeline, may be determined.

Typically, control electronics (e.g., control electronics package 124) cause the transducers (e.g., 112, 114) to fire, receive the output of the transducers, compute the mean flow velocity for each chord, compute the mean flow velocity for the meter, compute the volumetric flow rate through the meter, and perform meter diagnostics. The volumetric flow rate and possibly other measured and computed values, such as flow velocity and speed of sound, are then output to additional devices, such as a flow computer, that are external to the meter 100.

As mentioned above, each ultrasonic transducer 112, 114 typically includes a piezoelectric crystal. The piezoelectric crystal is the active element that emits and receives sound energy. The piezoelectric crystal comprises a piezoelectric material such as lead zirconate titanate (PZT) and electrodes on the surface of the piezoelectric material. The electrodes are typically a thin layer of a conductive material such as silver or nickel. A voltage difference applied between the electrodes induces an electric field within the piezoelectric material that causes it to change shape and emit sound energy. Sound energy impinging on the piezoelectric material causes the piezoelectric material to change shape and develop a voltage between the electrodes. The piezoelectric crystal is typically encapsulated within an epoxy that holds the piezoelectric crystal in place, protects the piezoelectric crystal, and provides a matching layer to improve the coupling of sound energy between the piezoelectric crystal and fluid within the meter 110.

For a given chord, the chordal flow velocity v is given by:

$$v = \frac{L^2}{2X} \cdot \frac{T_{up} - T_{dn}}{T_{up} T_{dn}}, \quad (1)$$

and the chordal speed of sound c is given by:

$$c = \frac{L}{2} \cdot \frac{T_{up} + T_{dn}}{T_{up} T_{dn}} \quad (2)$$

where:
L is the path length (i.e., face-to-face separation between upstream and downstream transducers),
X is the component of L within the meter bore in the direction of the flow, and
$T_{up}$ and $T_{dn}$ are the upstream and downstream transit times of sound energy through the fluid.

The average flow velocity through the meter 100 is given by:

$$v_{avg} = \sum_i w_i v_i \quad (3)$$

where:
$w_i$ is a chordal weighting factor,
$v_i$ is the measured chordal flow velocity, and
the summation i is over all chords.
For additional information see U.S. Pat. Nos. 3,564,912, 3,940,985, and 4,646,575.

The flow rate $Q_{flow}$ through the meter 100 is then given by:

$$Q_{flow} = v_{avg} A \quad (4)$$

where A is the cross-sectional area of the central bore 104.

Figure 5:
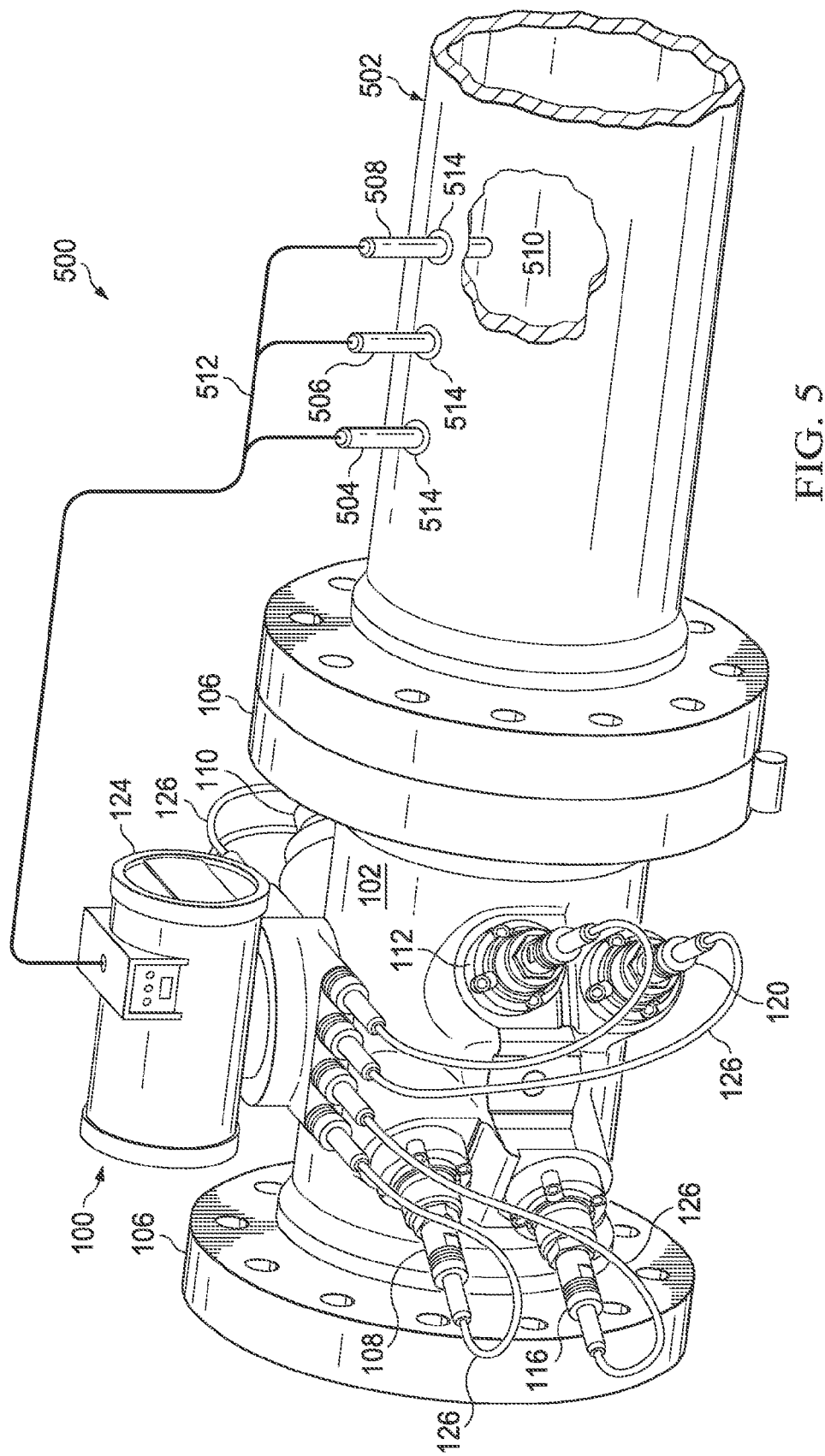
FIG. 5 shows an ultrasonic flow metering system in accordance with various embodiments.

FIG. 5 shows an ultrasonic flow metering system 500 in accordance with various embodiments. In the system 500, the ultrasonic flow meter 100 is coupled to a pipe or other structure 502. In some embodiments, the pipe 502 is disposed downstream of the ultrasonic flow meter 100. The pipe 502 includes openings 514 that allow sensors 504-508 to access the fluid stream flowing through the system 500. The sensors 504-508 measure various attributes or parameters of the fluid, and provide the measurements to the control electronics 124 via signal conduction media 512 (e.g., wiring). The sensor 504 is a gas composition sensor, such as a gas chromatograph, that provides information indicative of the amount of each constituent of the gas flowing through the system 500. The sensor 506 is pressure sensor that provides signals indicative of the pressure of the fluid flowing in the system 500. The sensor 508 is a temperature sensor (e.g., a resistance temperature detector) that provides signals indicative of the temperature of the fluid flowing through the system 500. The temperature sensor 508 extends into the interior passage 510 of the pipe 502, and measures the temperature of the fluid flowing through the system 500 at the terminus of sensor 508. Thus, the temperature sensor 502 is positioned to measure the temperature of the fluid at a specific elevation.

From the fluid composition, pressure, and temperature information provided by sensors 504, 506, and 508 respectively, the control electronics 124 can compute the speed of sound through the fluid using predetermined theoretical or experimental values. For example, the control electronics may compute speed of sound in the fluid as specified in American Gas Association Report No. 10, "Speed of Sound in Natural Gas and Other Related Hydrocarbons" (AGA 10). Some embodiments of the control electronics 124 may use this computed speed of sound to verify the speed of sound values measured for each chord of the meter 100.

The ultrasonic flow meter 100 measures the volume of fluid flowing through the meter at the temperature and pressure of the fluid. Consequently, reporting only the volume (or flow rate which is the volume per unit time) of fluid flowing through the meter 500 fails to fully quantify the amount of the fluid passing through meter 100. For example, 1 cubic meter ($m^3$) of methane at 30 pounds per square inch absolute (psia) and 78 degrees Fahrenheit (° F.) constitutes an amount (e.g., mass or number of moles) of fluid approximately twice that of 1 $m^3$ of methane at 15 psia and 78° F. Therefore, volumetric flow is reported with reference to a specific temperature and pressure. Embodiments of the flow meter 100 apply a standard base condition for the temperature and pressure referenced when specifying volumes. For example, for use in the oil and gas industry, the flow meter 100 may apply a base condition of 14.7 psia (1 atmosphere) and 60° F. Some embodiments may apply base conditions employing other temperatures and/or pressures.

The flow rate $Q_{base}$ at a standard base temperature $T_{base}$ (e.g., 60° F.) and pressure $p_{base}$ (e.g., 14.7 psia) can be related to the measured flow rate $Q_{flow}$ through the meter 100 at the measured temperature $T_{flow}$ and pressure $p_{flow}$ within the meter according to:

$$Q_{base} = \frac{p_{flow}}{p_{base}} \cdot \frac{T_{base}}{T_{flow}} \cdot \frac{Z_{base}}{Z_{flow}} \cdot Q_{flow}, \quad (5)$$

where Z is the compressibility factor of the fluid. The thermodynamic properties of gas within the meter 100 typically deviate from those of an ideal gas. The deviations from the properties of an ideal gas can be quantified by the compressibility factor Z which may be expressed as:

$$Z = \frac{pV}{nRT} \quad (6)$$

where:
p is pressure,
V is volume,
n is the number of moles,
R is the gas constant, and
T is the absolute temperature.

An ideal gas has a compressibility factor of one. AGA 10 allows the compressibility factor (Z) to be computed given the temperature, pressure, and composition of the gas.

The flow meter 100 includes multiple chords, each chord at a different elevation within the meter 100. For example, the meter 100, as shown in FIG. 3, includes four different chords (A, B, C, D) each at a different elevation within the meter 100. A temperature gradient may occur in the fluid flowing through the meter 100 when the fluid is inadequately mixed or when one portion of the meter 100 is exposed to a higher temperature than another portion. For example, if the upper surfaces of the meter 100 are exposed to direct sunlight, then the temperature of fluid passing through chord A may be higher than the temperature of fluid passing through chord B, which is higher than the temperature of fluid passing through chord C, and so on. The magnitude of any temperature gradient between the top and bottom of the meter 100 tends to increase with increasing meter size and can exceed several degrees Fahrenheit. A temperature gradient can cause the measured temperature $T_{flow}$ to be incorrect which will in turn cause the base flow rate $Q_{base}$ to be incorrect.

A temperature gradient can cause each chord of the meter 100 to be at a different temperature and have a different measured speed of sound than the speed of sound calculated for the fluid using a temperature measured at a single elevation within the system 500 (i.e., the temperature ($T_{flow}$) measured by the temperature sensor 508). Thus, when a temperature gradient is present in the fluid flowing through the meter 100, the temperature measured by the temperature sensor 508 may not accurately reflect the fluid temperature at the chords or the average fluid temperature within the meter.

Embodiments of the meter 100 are configured to detect a temperature gradient based on the chordal speeds of sound, and to generate an alert indicating that a temperature gradient is present and that $Q_{base}$ may be incorrect. Responsive to the alert, the temperature discrepancy and associated flow measurement errors may be investigated and corrected.

If a temperature gradient is detected, some embodiments of the meter 100 may employ a temperature value derived from the chordal speeds of sound to correct the measured temperature $T_{flow}$, and to in turn correct the base flow rate $Q_{base}$. Given the measured chordal speeds of sound, measured fluid pressure, and gas composition, the temperature at each chord may be computed in accordance with AGA 10. Embodiments may apply a numerical method to compute the temperature at which a speed of sound based on AGA 10 agrees with the measured chordal speed of sound. Some embodiments may employ the bisection method and start with initial temperature estimates that are greater than (e.g., +10° F.) and less than (e.g., −10° F.) the measured temperature $T_{flow}$. An alternative embodiment may compute the speeds of sound at two fixed temperatures that are greater than (e.g., +10° F.) and less than (e.g., −10° F.) the measured temperature $T_{flow}$ and then determine the temperature at each chord by linear interpolation between the two precomputed fixed temperatures.

Based on the correct flow temperatures $T_{flow}^{i}$ for each chord, embodiments can compute a corrected flow temperature $T_{flow}^{corrected}$ as:

$$T_{flow}^{corrected} = \sum_i w_i T_{flow}^i, \quad (7)$$

where $w_i$ is the chordal weighting factor and the summation i is over all chords. The chordal weighting factor $w_i$ is the factor applied to determine the average flow velocity from the chordal flow velocities per equation (3). Embodiments can apply $T_{flow}^{corrected}$ in Equation 5 to compute $Q_{base}$.

Figure 6:
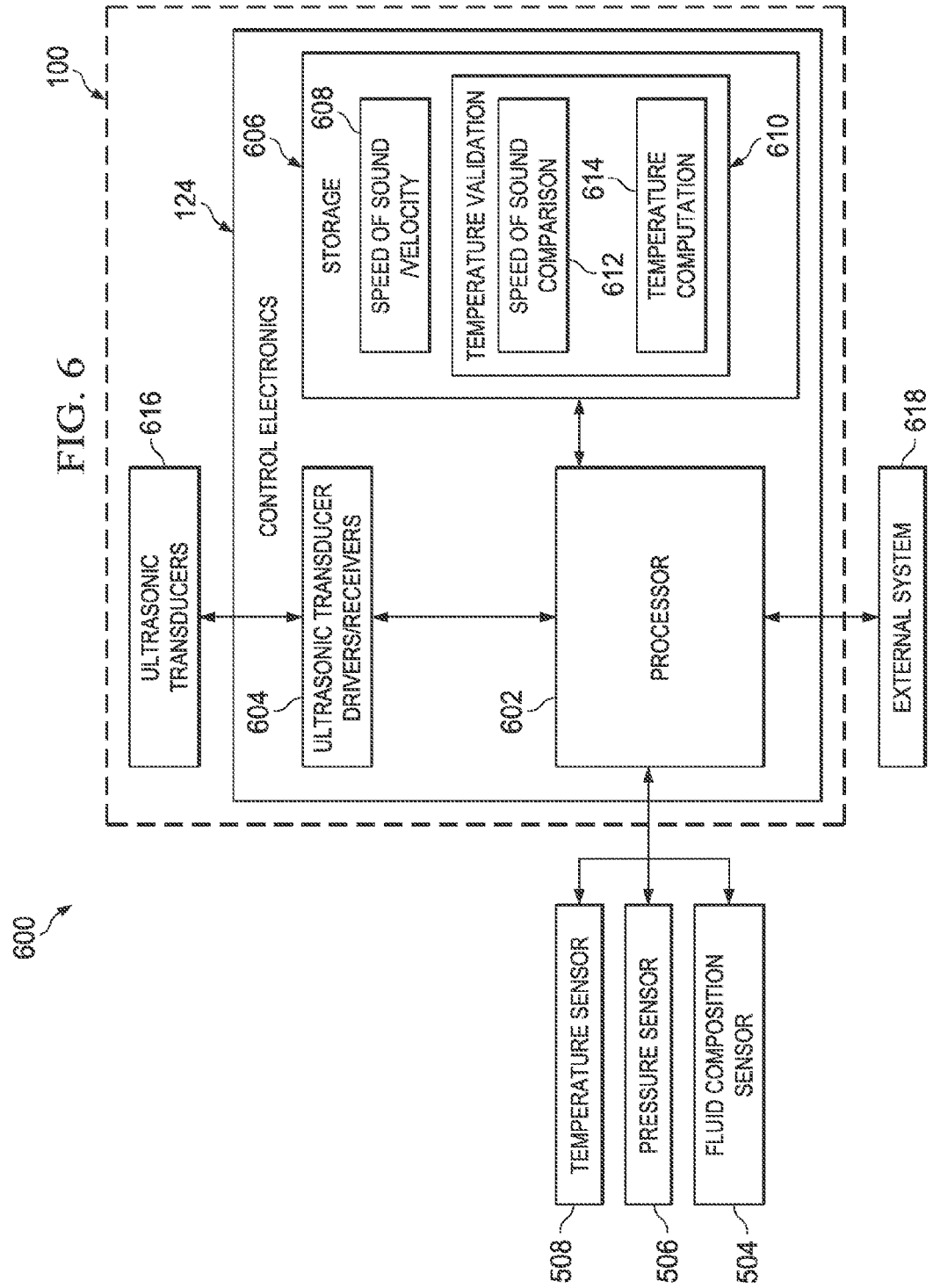
FIG. 6 shows a block diagram of a system for verifying temperature measurements in an ultrasonic meter in accordance with various embodiments.

FIG. 6 shows a block diagram of a system 600 for validating temperature measurements in an ultrasonic meter 100 in accordance with various embodiments. The system 600 may be implemented in the system 500 of FIG. 5. The system 600 includes the ultrasonic meter 100, the temperature sensor 508, the pressure sensor 506, and the gas composition sensor 504.

The control electronics 124 include ultrasonic transducer drivers/receivers 604, processor 602, and storage 606. The ultrasonic transducer drivers/receivers 604 generate and drive electrical signals to the ultrasonic transducers 616, and receive electrical signals from the ultrasonic transducers 616. The ultrasonic transducers 616 comprise the transducers 108, 110, 112, 114, 116, 118, 120, 122.

The processor 602 is coupled to the ultrasonic transducer drivers/receivers 616. The processor 602 controls the generation of electrical signals provided to the ultrasonic transducers 616 and processes signals received from the ultrasonic transducers 616 to ascertain speed of sound, flow rate, etc. The processor 602 may include, for example, one or more general-purpose microprocessors, digital signal processors, microcontrollers, or other devices capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 606 is coupled to the processor 602. The storage 606 is a non-transitory computer-readable storage medium and may include volatile storage such as random access memory, non-volatile storage (e.g., a hard drive, an optical storage device (e.g., CD or DVD), FLASH storage, read-only-memory), or combinations thereof. The storage 606 includes instructions for execution by the processor 602, and data values produced by and/or processed via processor 602 instruction execution.

More specifically, the storage 606 includes a speed of sound and velocity computation module 608 that includes instructions executable by the processor for computation of chordal speed of sound and fluid velocity based on propagation times of ultrasonic signals between the transducers 616 (i.e., transducers of a transducer pair). The storage 606 also includes a temperature validation module 610 that includes instructions for validating the temperature value provided by the temperature sensor 508. The temperature validation module 610 may include a speed of sound comparison module 612 that includes instructions that cause the processor 602 to compare the chordal speed of sound values to one another and identify a temperature gradient based on the comparison. In some embodiments, the speed of sound comparison module 612 identifies anomalous speed of sound values (i.e., outliers) and excludes such values from the comparison. If the temperature gradient exceeds a predefined maximum gradient value, then the processor 602 may generate an alert signal. The alert signal may be provided to the external system 618 for presentation to a user.

The temperature validation module 610 may include a temperature computation module 614 that includes instructions that cause the processor 602 to compute a temperature value corresponding to each chordal path. The temperature value for a chordal path may be computed based on the chordal speed of sound, measured fluid pressure provided by the pressure sensor 506, and gas composition provided by the gas composition sensor 504. The temperature computation module 614 may compute an average fluid temperature based on the computed temperatures for each chordal path. In some embodiments, the temperature computation module 614 identifies anomalous speed of sound values (i.e., outliers) and excludes such values from the average fluid temperature computation. If the computed average fluid temperature differs from the measured fluid temperature by more that a predetermined maximum difference value, then the processor may generate an alert signal. The alert signal may be provided to the external system 618 for presentation to a user.

Figure 7:
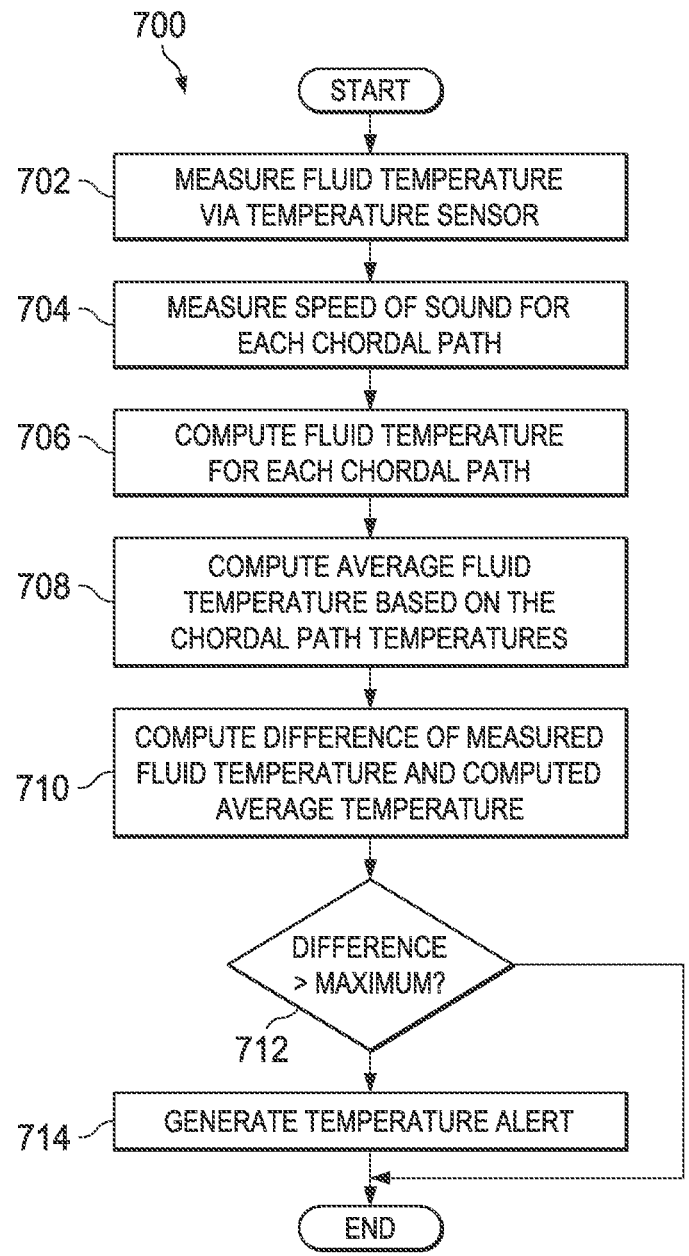
FIG. 7 shows a flow diagram for a method for validating temperature measurements in an ultrasonic flow meter in accordance with various embodiments.

FIG. 7 shows a flow diagram for a method for validating temperature measurements in an ultrasonic flow meter 100 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 7, as well as other operations described herein, can be implemented as instructions stored in computer readable medium 606 and executed by processor 602.

In block 702, fluid is flowing through the central passage 104 of the meter 100. The temperature sensor 508 measures the temperature of the fluid flowing about the temperature sensor 508. The meter 100 processes temperature measurement signals provided by the temperature sensor 508, and produces a fluid temperature measurement value. The fluid temperature measurement value is indicative of the temperature of the fluid flowing at the elevation at which the temperature sensor 508 is disposed in the pipe 502, and consequently, may not accurately reflect the temperature of the fluid flowing at a different elevation within the pipe 502 or the meter 100.

In block 704, the processor 602 of the meter 100 is causing the ultrasonic transducer drivers/receivers 604 to generate ultrasonic signals that are exchanged between the transducers of each transducer pair (e.g., 112, 114). The meter 100 measures the ultrasonic signal transit times between the transducers, and computes a speed of sound value for each transducer pair (i.e., for each chordal path), as shown in equation (2).

In block 706, the meter 100 computes a fluid temperature value for each chordal path. The meter 100 may read a fluid pressure value from the pressure sensor 506 and composition from the fluid composition sensor 504, and apply the pressure and composition values in conjunction with the speed of sound measured for chordal path to compute the temperature for each chordal path. Some embodiments of the meter 100 compute the chordal temperatures in accordance with AGA 10 as described above.

In block 708, the meter 100 computes an average fluid temperature based on the computed temperatures for the chordal paths. Anomalous chordal speed of sound and/or temperature values may be excluded from the average temperature computation.

In block 710, the meter 100 computes the difference of the measured fluid temperature and the computed average fluid temperature. If, in block 712, the difference exceeds a predetermined maximum difference value, then the measured fluid temperature may not accurately represent the temperature of the fluid flowing through the meter 100, and the meter 100 generates a temperature alert in block 714. Responsive to the temperature alert the source of the temperature discrepancy may be investigated and corrected.

Figure 8:
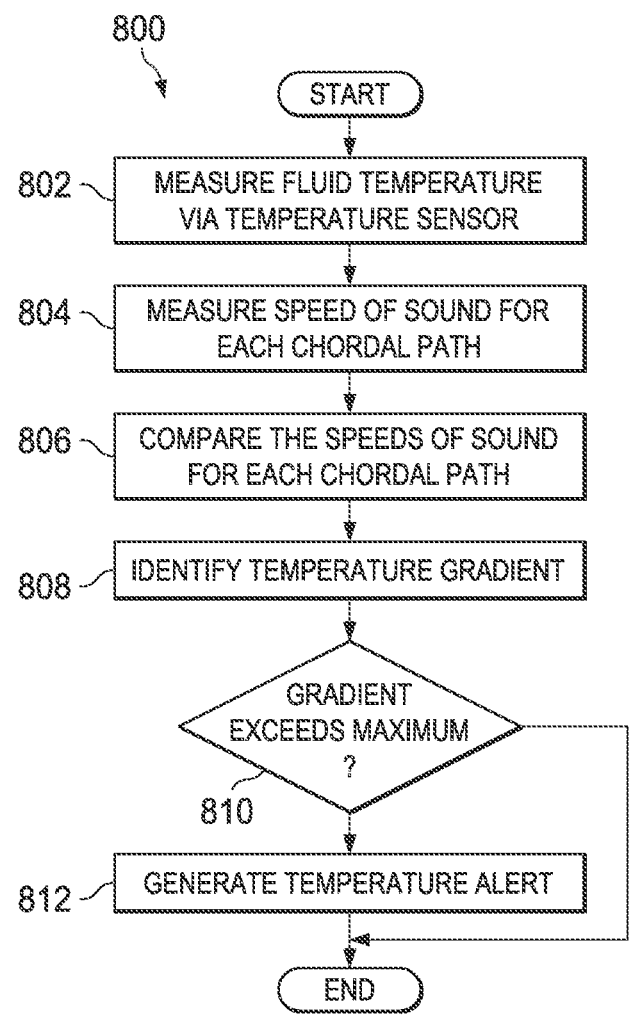
FIG. 8 shows a flow diagram for a method for validating temperature measurements in an ultrasonic flow meter in accordance with various embodiments.

FIG. 8 shows a flow diagram for a method for validating temperature measurements in an ultrasonic flow meter 100 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 8, as well as other operations described herein, can be implemented as instructions stored in computer readable medium 606 and executed by processor 602.

In block 802, fluid is flowing through the central passage 104 of the meter 100. The temperature sensor 508 measures the temperature of the fluid flowing about the temperature sensor 508. The meter 100 processes temperature measurement signals provided by the temperature sensor 508, and produces a fluid temperature measurement value. The fluid temperature measurement value is indicative of the temperature of the fluid flowing at the elevation at which the temperature sensor 508 is disposed in the pipe 502, and consequently, may not accurately reflect the temperature of the fluid flowing at a different elevation within the pipe 502 or the meter 100.

In block 804, the processor 602 of the meter 100 is causing the ultrasonic transducer drivers/receivers 604 to generate ultrasonic signals that are exchanged between the transducers of each transducer pair (e.g., 112, 114). The meter 100 measures the ultrasonic signal transit times between the transducers, and computes a speed of sound value for each transducer pair (i.e., for each chordal path), as shown in equation (2).

In block 806, the meter 100 compares the speed of sound values computed for each chordal path. In comparing the speed of sound values, the meter 100 determines whether a temperature gradient is present in fluid passing through the meter 100 in block 808. A temperature gradient may be identified by a corresponding gradient in the computed speed of sound values. Thus, if the speed of sound corresponding to chord A is greater than the speed of sound corresponding to chord B, which is greater than the speed of sound corresponding to chord C, etc., then a temperature gradient may be identified in the fluid.

In some embodiments, the meter 100 may compute a temperature value for each chord based on the computed speed sound for the chord, measured fluid pressure, and measured fluid composition, and compare the chordal temperature values to identify a temperature gradient.

In block 810, the meter 100 evaluates the identified gradient to determine whether the gradient is indicative of a potentially inaccurate temperature measurement by the temperature sensor 508. For example, if the range of chordal speed of sound values or chordal temperature values exceeds a predetermined maximum value, then the meter 100 may deem the temperature measurement provided by the temperature sensor 508 to inaccurately represent the temperature of the fluid flowing through the meter 100. If the meter determines that the temperature measurement provided by the temperature sensor 508 may inaccurately represent the temperature of the fluid flowing through the meter 100, then the meter 100 generates a temperature alert in block 812. Responsive to the temperature alert the source of the temperature discrepancy may be investigated and corrected.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An ultrasonic flow metering system, comprising:
   a passage for fluid flow;
   a temperature sensor disposed to measure the temperature of fluid flowing in the passage;
   an ultrasonic flow meter, comprising:
      a plurality of pairs of ultrasonic transducers, each pair of transducers configured to form a chordal path across the passage between the transducers; and
      control electronics coupled to the ultrasonic transducers, the control electronics configured to:
         measure speed of sound between each pair of transducers based on ultrasonic signals passing between the transducers of the pair; and
         determine, based on the measured speeds of sound, whether a gradient is present, across the chordal paths, in the fluid flowing in the passage; and
         determine, based on the gradient, whether a measured temperature value provided by the temperature sensor accurately represents the temperature of the fluid flowing in the passage.

2. The ultrasonic flow metering system of claim 1, wherein the control electronics are configured to compute a temperature value for each chordal path based on the measured speed of sound for the chordal path.

3. The ultrasonic flow metering system of claim 2, wherein the control electronics are configured to:
   compare the computed temperature value for each chordal path; and
   determine, based on the compared temperature values, whether a temperature gradient is present, and, based on the temperature gradient, whether the temperature sensor is providing a measured temperature value that accurately represents the temperature of the fluid flowing in the passage.

4. The ultrasonic flow metering system of claim 1, wherein the control electronics are configured to determine whether a computed volume of the fluid flowing in the passage is potentially incorrect based on the gradient.

5. The ultrasonic flow metering system of claim 2, wherein the control electronics are configured to: identify a trend of increasing temperature across the passage as indicating that the measured temperature value inaccurately represents the temperature of the fluid flowing in the passage.

6. The ultrasonic flow metering system of claim 1, wherein the control electronics are configured to generate, based on the measured speeds of sound, an alert signal indicating that the measured temperature value inaccurately represents the temperature of the fluid flowing in the passage.

7. The ultrasonic flow metering system of claim 1, wherein the flow meter comprises at least four chordal paths.

8. The ultrasonic flow metering system of claim 1, wherein the control electronics are configured to:
   compare the measured speeds of sound between each pair of transducers; and
   identify a trend of increasing speed of sound across the passage as indicating that a speed of sound gradient is present, and, based on the speed of sound gradient, that the measured temperature value inaccurately represents the temperature of the fluid flowing in the passage.

9. A method for verifying temperature of a fluid in a fluid stream, comprising:
   measuring speed of sound for each of a plurality of chordal paths of an ultrasonic meter based on ultrasonic signals passing between a transducer pair of each chordal path;
   measuring temperature of fluid in the fluid stream based on a signal provided by a temperature sensor disposed in the fluid stream;
   identifying, based on the speed of sound measured for each chordal path, whether a gradient is present in the fluid stream across the chordal paths; and
   determining, based on the gradient, whether the measured temperature accurately represents the temperature of the fluid in the fluid stream.

10. The method of claim 9, further comprising determining whether a computed volume of the fluid stream is potentially incorrect based on the gradient.

11. The method of claim 9, further comprising:
    computing a temperature value for each chordal path based on the measured speed of sound for the path; and
    comparing the computed temperature values to identify a temperature gradient in the fluid stream.

12. The method of claim 11, further comprising:
    identifying a trend of increasing temperature across the chordal paths as indicating that the measured temperature value inaccurately represents the temperature of the fluid in the fluid stream.

13. The method of claim 9, further comprising:
    comparing the measured speeds of sound for the chordal paths; and
    wherein the identifying comprises determining, based on the compared speeds of sound, that a speed of sound gradient is present across the chordal paths, and that the measured temperature inaccurately represents the temperature of the fluid in the fluid stream.

14. The method of claim 9, wherein the identifying comprises identifying a trend of increasing speed of sound across the chordal paths as indicating that the measured temperature value inaccurately represents the temperature of the fluid in the fluid stream.

15. The method of claim 9, further comprising generating an alert signal indicating that the measured temperature value inaccurately represents the temperature of the fluid in the fluid stream.

16. An ultrasonic flow meter, comprising:
    a plurality of pairs of ultrasonic transducers, each pair of transducers configured to form a chordal path across a fluid passage between the transducers; and
    control electronics coupled to the ultrasonic transducers, and configured to:
       measure speed of sound for each chordal path based on ultrasonic signals passing between the transducers of the chordal path;
       determine temperature of fluid in a fluid stream, the determined temperature based on a measurement by a temperature sensor disposed in the fluid stream;
       determine, based on the speed of sound measured for each chordal path, whether a gradient is present in the fluid stream; and
       determine, based on the gradient, whether the determined temperature accurately represents the temperature of the fluid in the fluid stream.

17. The ultrasonic flow meter of claim 16, wherein the control electronics are configured to: determine whether a computed volume of the fluid in the fluid stream is potentially incorrect based on the gradient.

18. The ultrasonic flow meter of claim 17, wherein the control electronics are configured to:
compute a temperature value for each chordal path based on the measured speed of sound for the chordal path; and
compare the computed temperature values to determine whether a temperature gradient is present in the fluid stream.

19. The ultrasonic flow meter of claim 16, wherein the control electronics are configured to:
compute a temperature value for each chordal path based on the measured speed of sound for the chordal path; and
identify a gradient in temperature across the chordal paths as indicating that the determined temperature inaccurately represents the temperature of the fluid in the fluid stream.

20. The ultrasonic flow meter of claim 16, wherein the control electronics are configured to:
compare the measured speeds of sound for the chordal paths; and
determine, based on the compared speeds of sound, that a speed of sound gradient is present across the fluid stream, and that the determined temperature inaccurately represents the temperature of the fluid in the fluid stream.

21. The ultrasonic flow meter of claim 16, wherein the control electronics are configured to identify a gradient in speed of sound across the chordal paths as indicating that the determined temperature value inaccurately represents the temperature of the fluid in the fluid stream.

22. The ultrasonic flow meter of claim 16, wherein the control electronics are configured to generate an alert signal indicating that the determined temperature value inaccurately represents the temperature of the fluid in the fluid stream.

* * * * *